United States Patent [19]

Herden

[11] 4,226,126

[45] Oct. 7, 1980

[54] MECHANICAL DISPLACEMENT-ELECTRICAL SIGNAL TRANSDUCER

[75] Inventor: Werner Herden, Stuttgart, Fed. Rep. of Germany

[73] Assignee: Robert Bosch GmbH, Stuttgart, Fed. Rep. of Germany

[21] Appl. No.: 20,226

[22] Filed: Mar. 13, 1979

[30] Foreign Application Priority Data

Apr. 8, 1978 [DE] Fed. Rep. of Germany ....... 2815324

[51] Int. Cl.³ .............................................. G01L 9/10
[52] U.S. Cl. ...................................... 73/728; 73/722; 336/20; 336/30
[58] Field of Search ................. 73/728, 722, 704, 708, 73/DIG. 2; 336/20, 30

[56] References Cited
U.S. PATENT DOCUMENTS 4,068,527  1/1978  Jost et al. ................................ 73/704

FOREIGN PATENT DOCUMENTS 442441  2/1936  United Kingdom ................ 73/DIG. 2
474710  10/1975  U.S.S.R. ................................ 73/DIG. 2

*Primary Examiner*—Donald O. Woodiel
*Attorney, Agent, or Firm*—Frishauf, Holtz, Goodman & Woodward

[57] ABSTRACT

To measure small displacements, for example displacement of a membrane under change of pneumatic pressure applied at opposite sides thereto, a ferromagnetic wire is stretched between a fixed support and the membrane. An exciter coil, connected to a source of alternating current of suitable strength cyclically reversely magnetizes the ferromagnetic wire. A pick-up coil is electromagnetically coupled to the wire to sense the change of magnetization thereof which will be in the form of sharp needle pulses as the magnetization of the wire changes, the pulse amplitude and pulse width being highly dependent on the strain in the wire and hence on the deflection of the membrane. The wire may be stressed under tension.

14 Claims, 3 Drawing Figures

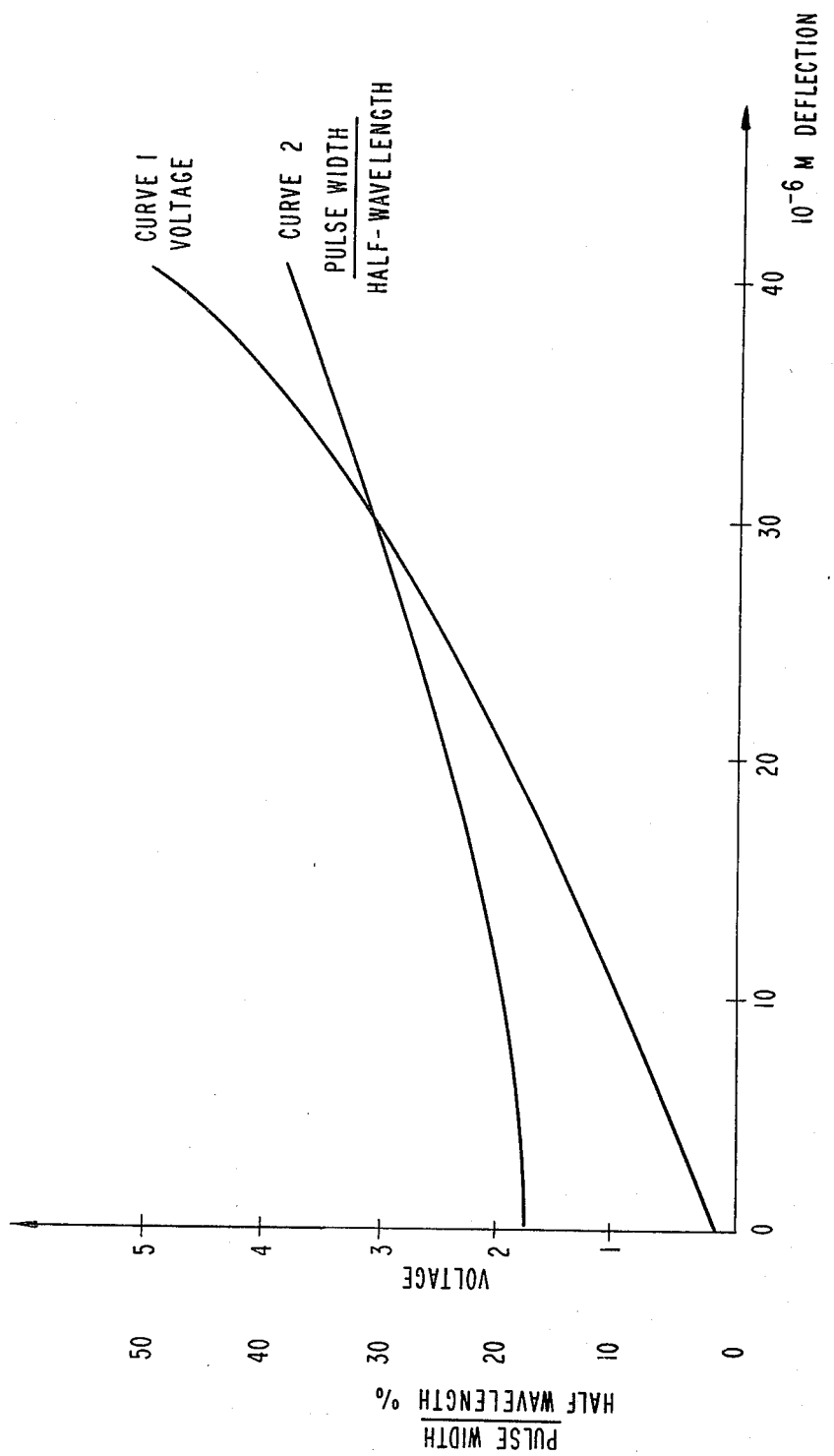

MECHANICAL DISPLACEMENT-ELECTRICAL SIGNAL TRANSDUCER

REFERENCE TO RELATED APPLICATION

U.S. Ser. 8955, filed Feb. 2, 1979, HERDEN.

The present invention relates to a displacement-electrical/or force-electrical signal transducer to provide an electrical output signal representative of displacement of a mechanical element, and more particularly representative of small displacements.

Background and Prior Art. It is often necessary to measure small displacements, and more particularly mechanical displacements which can be transmitted as deflections of a membrane. Transducers which provide electrical output signals representative of deflection of a membrane have been previously proposed, for example by coupling the membrane to an inductance and shifting the position of a core within the inductance. The change in inductance can then be detected by well-known electrical circuits, for example by applying electrical oscillations derived from an oscillator to the inductance and testing for frequency shift, input and output to the inductance, and the like. In one embodiment, the frequency of oscillation of the oscillator is determined and will be representative of pressure applied to the membrane, and hence its deflection.

Mechanical-electrical transducers of this type are comparatively complex and require evaluation or other associated circuitry which may be complicated. To obtain a suitable output signal which can be clearly differentiated from noise signals or disturbance signals requires comparatively large deflection of the membrane and hence of the mechanical element coupled thereto.

The Invention. It is an object to provide a transducer which is simple and hence inexpensive, and which permits use with simple evaluation circuitry, while being sensitive and sensing even small deflections of a membrane.

Briefly, a support is provided which defines an end holding area, for example a cup-shaped or hollow housing element, closed off at one end by a deflectable holder, such as a membrane, spaced from the end holder. The deflectable holder or membrane is movable in accordance with the displacement to be measured, for example having a force applied thereto causing deflection of the membrane. A ferromagnetic wire is stretched between the end holder and the deflectable holder, typically the membrane. An exciter coil is magnetically coupled to the wire and has current applied thereto to alternately reversely magnetize the wire. A pick-up coil, magnetically coupled to the wire, senses characteristics of change of magnetization upon induced alternating reversal of magnetization of the wire. The strain of the wire, as the deflectable holder deflects, will cause a change in the characteristics of magnetization change over upon induced alternate reverse magnetization. This change in the characteristics of magnetization change-over can be detected by an evaluation circuit connected to the pick-up coil. The wire is a ferromagnetic, Fe alloy type wire; the exciter coil can be coupled to any suitable source of alternate current. The evaluation circuit preferably includes a rectifier and filter capacitor network coupled to an output indicator.

The transducer can be made small, hence inexpensive, and the evaluation circuitry can be simple. Even very small deflections of the membrane will have substantial effects on the signal to be obtained from the transducer.

Drawings, illustrating a preferred example:

FIG. 3 is a graph of deflection (abscissa) with respect to voltage, and pulse width, respectively.

Figure 1:
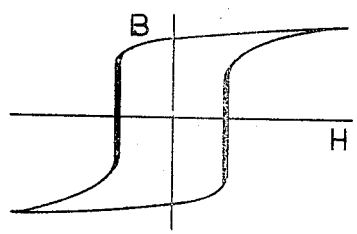
FIG. 1 is a highly schematic diagram of the magnetization curve of magnetic field strength H (abscissa) with respect to induction B (ordinate)

The magnetization curve of FIG. 1 illustrates the relationship of magnetic induction of a suitable substance which is strained, that is, is stressed either in tension and torsion, or both, with respect to effective field strength. The particular shape of the magnetization curve is determined by various elementary magnetic processes. In demagnetized state, a ferromagnetic crystal is subdivided by the Bloch separations in Weiss domains, the spontaneous magnetization of which is in random directions. The average magnetization of the overall crystal, therefore, is effectively zero. Upon application of an external magnetic field, spontaneous magnetization of all of the Weiss domains in the direction of the field is constrained with increasing field strength into parallel direction. At a specific field strength, an entire volumetric region will change into the magnetically preferred range, which in the curve occurs at those regions where the slope of the curve is steep. This results in large Barkhausen phenomenon or Barkhausen magnetization jump. The change in magnetic induction vs. field strength, as can be seen, is highly non-linear. The two large Barkhausen jumps may well have twice the level of the saturation induction if the material is sufficiently stressed. For example, the material may be a wire which is subjected to stress in tension and/or torsion, so that the wire itself will be strained. Change in magnetization, that is, remagnetization in opposite direction, is obtained when a certain threshold of field strength H occurs, causing remagnetization. The remagnetization speed is independent of the speed of the change of the field strength, and thus is not directly dependent on the frequency of the change in direction of the field. Since the remagnetization speed is high, a pick-up signal will be induced in a pick-up coil electromagnetically associated with the stressed wire. The amplitude and pulse width of increase the pick-up signal is a function of stress placed on the wire. Amplitudes and pulse width as the strain in the wire increases.

Figure 2:
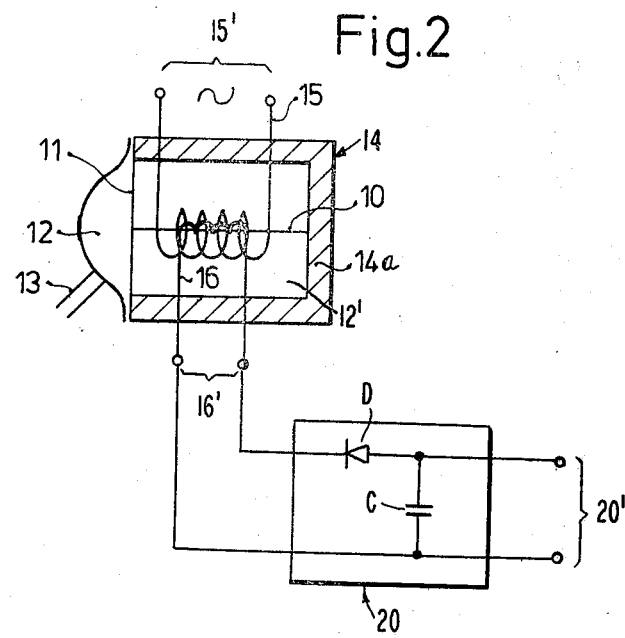
FIG. 2 is a vertical cross-sectional view, highly schematic, of the transducer.

A transducer structure is shown, highly schematically, in FIG. 2. A wire 10, placed under strain, is connected to a membrane 11. The membrane 11 is a component of a pressure diaphragm chamber 12, having a fluid connection line 13 attached thereto. The wire 10 is fixedly secured to the end wall 14a of a housing 14, for example by being welded, clamped, or otherwise rigidly attached thereto. If a vacuum is applied to the connection 13, the diaphragm chamber 12 will have atmospheric under-pressure therein and the membrane will tend to bulge towards the left (FIG. 2) introducing a strain in the wire 10. The wire 10 has a coil 15 electromagnetically coupled thereto, for example by being wound therearound, to which an alternating current is applied as schematically indicated at 15'. A pick-up coil 16 is additionally electromagnetically coupled to the wire 10, for example being wound thereabout.

If an alternating current of sufficient value is connected to coil 15, wire 10 is continuously remagnetized in magnetically opposite direction. As described above, the pick-up coil 16 will, upon each remagnetization, have short needle pulses appear thereat. The amplitude as well as the pulse width of these pulses will be highly dependent on the stress applied to the wire 10, that is, on the strain in the wire and to which the wire 10 is subjected. The voltages induced in the pick-up coil 16 as a consequence of the remagnetization of the wire 10 are available at terminal 16' and are connected to an evaluation circuit 20 which, preferably, includes a diode to rectify the peak output pulses and a capacitor C to form an average value, so that at the output terminals 20' a d-c voltage is available, the amplitude of which is a level representative of pressure or, rather, vacuum within chamber 12, that is, of the deflection of the membrane 11.

The overall arrangement permits obtaining an electrical output signal which is representative of displacement of the membrane 11 or of the force of wire 10 or, as shown, of the pressure (or vacuum) within chamber 12, or in a chamber 12' within the housing 14, to which a suitable pressure line can be connected, similar to the connection line 13. The pick-up coils 16 can be directly connected to an evaluation circuit without further amplification which, in the simplest case, is a diode D and a capacitor C. The arrangement can be constructed in small dimensions and is sensitive to very small deflections of the membrane 11.

In a typical example, the wire 10 has the following approximate composition:
diameter of wire 10: 0.4 mm length of wire 20 mm. Under quiescent condition, the wire 10 is stressed by the membrane 11 in tension merely to be sufficiently taut to prevent sagging;
3000 turns of Cu wire are wrapped about the wire 10 to form coil 15, energized with a current of 50 mA, at a frequency of 1000 Hz. The pick-up coil had 3000 turns resulting, upon remagnetization, in voltage peaks of 100 mV at atmospheric pressure which changed to peaks of 5 V when a vacuum was applied.

The wave form of the output derived from coil 16 has a very small residual interference wave, due to coupling between coils 15 and 16, which is generally neglectible, but can be filtered out in the evaluation circuit 20.

The extent of stress of the wire has a relation to the output voltage. FIG. 3 illustrates a stress-voltage diagram in which the output voltage (peak value) from pick-up coil 16 is shown with respect to deflection of the membrane—see curve 1. The diagram also illustrates the relationship of width of the needle pulses derived from the pick-up coil 16, as a percentage of the half-wave wave length of the magnetizing current through coil 15, with respect to deflection of membrane 11—see curve 2. As can be seen, the time integral of energy transfer between the coils 15 and 16 changes moderately although the peak amplitude rises rapidly, and the pulse width increases as the wire 10 is stressed, thus providing sharply different types of output signals upon deflecting the membrane 11.

The wire 10 is a special ferromagnetic wire made of iron-alloy which has under stress the B-H characteristics of FIG. 1. Such materials are well known and commercially available, made, for example, under the trademarks "Koerflex" (by the Krupp company); "Vicalloy" (by Driver); "Magnetoflex" (by VAC, Vacuumschmelze, Hanau, Fed. Rep. Germany). Such wires, e.g. Vicalloy, Koerflex 300, have a composition of 38% of iron, 52% of Co, 10% V and, depending on desired use and manufacturer, minor additives.

I claim:

1. Displacement transducer to provide an electrical output signal representative of a small displacement comprising
   a support (14) having an end holder (14a);
   a deflectable holder (11) spaced from said end holder and movable in accordance with the displacement to be measured,
   and comprising, in accordance with the invention,
   a ferromagnetic wire (10) having an approximately rectangular B-H diagram characteristic stretched between said end holder (14a) and said deflectable holder (11);
   an exciter coil (15) magnetically coupled to said wire and alternately, reversely magnetizing said wire;
   a pickup coil (16) magnetically coupled to said wire and providing output pulses having characteristics representative of the strain on the wire as the deflectable holder (11) is displaced upon induced alternate reverse magnetization of said wire by said exciter coil., to permit obtaining a representation of said strain upon evaluation of the characteristics of said output pulses.

2. Transducer according to claim 1, wherein the displaceable holder is a membrane (11).

3. Transducer according to claim 1, further comprising a source of alternating current (15') connected to the exciter coil.

4. Transducer according to claim 1, further comprising an evaluation circuit (20) including a rectifier (D) and a filter capacitor (C) coupled to the pick-up coil (16).

5. Transducer according to claim 1, wherein said wire is an iron, a source of alternating current (15') is connected to the exciter coil, and an evaluation circuit (20) is provided including a rectifier (D) and a filter capacitor (C), and coupled to the pick-up coil;
   and wherein said displaceable holder is a membrane.

6. Fluid pressure transducer to provide an electrical output signal representative of a fluid pressure or vacuum, comprising
   a housing (14) having an end wall (14a), and a deflectable membrane (11) closing off said housing and forming one wall thereof opposite said end wall;
   means (13) connected to a source of fluid pressure or vacuum changing the relative pressure at opposite sides of said membrane;
   and comprising, in accordance with the invention, a ferromagnetic wire (10) having an essentially rectangular B-H diagram characteristic stretched between the end wall (14a) of said housing and said deflectable membrane (11);
   an exciter coil (15) magnetically coupled to said wire and connectable to a source of alternating current to alternately, reversibly magnetize said wire;
   and a pick-up coil (16) magnetically coupled to said wire providing output pulses having characteristics representative of the strain on the wire as the membrane deflects upon pressure applied by said source of fluid pressure or vacuum upon induced alternate reverse magnetization of the wire to permit obtaining a representation of said strain upon evaluation of the characteristics of said output pulses.

7. Transducer according to claim 6, further including an evaluation circuit (20) including a rectifier (D) and a filter capacitor (C) coupled to the pick-up coil.

8. Transducer according to claim 6, further including diaphragm chamber means (12) located at the side of the membrane (11) remote from said housing end wall;
the means changing the relative pressure at opposite sides of said membrane being connected to said diaphragm chamber means.

9. Transducer according to claim 8, wherein said transducer is a pneumatic transducer and said source comprises a vacuum source.

10. Transducer according to claim 9, further including an evaluation circuit (20) including a rectifier (D) and a filter capacitor (C) coupled to the pick-up coil.

11. Force transducer to provide an electrical output signal representative of a force comprising
a housing (14) having an end holder (14a);
a deflectable holder (11) spaced from that holder as a means to apply the force to the wire and movable in accordance with the force to be measured, and comprising, in accordance with the invention, a ferromagnetic wire (10) having an essentially rectangular B-H diagram characteristic stretched between said end holder (14a) and said deflectable holder (11);
an exciter coil (15) magnetically coupled to said wire and connectable to a source of alternating current to alternately reversibly magnetize said wire;
and a pick-up coil (16) magentically coupled to said wire and providing output pulses having characteristics representative of the strain on the wire as the deflectable holder is displaced as a consequence of the application of the force, upon induced alternate reverse magnetization of the wire by said exciter coil to permit obtaining a representation of said strain upon evaluation of the characteristics of said output pulses.

12. Transducer according to claim 11, wherein the deflectable holder is a membrane.

13. Transducer according to claim 11, further comprising a source of alternating current (15') connected to the exciter coil.

14. Transducer according to claim 11, further comprising an evaluation circuit (20) including a rectifier (D) and a filter capacitor (C) coupled to the pick-up coil.

* * * * *

UNITED STATES PATENT AND TRADEMARK OFFICE
CERTIFICATE OF CORRECTION

PATENT NO. : 4,226,126

DATED : October 7, 1980

INVENTOR(S) : Werner HERDEN

It is certified that error appears in the above-identified patent and that said Letters Patent are hereby corrected as shown below:

Column 6, line 6, change "magentically" to magnetically.

Signed and Sealed this

Tenth Day of March 1981

[SEAL]

Attest:

RENE D. TEGTMEYER

Attesting Officer

Acting Commissioner of Patents and Trademark